(12) United States Patent
Arthur et al.

(10) Patent No.: US 7,641,993 B2
(45) Date of Patent: Jan. 5, 2010

(54) EXHAUST EMISSIONS CONTROL OF HYDROGEN THROUGHOUT FUEL CELL STACK OPERATION

(75) Inventors: David A. Arthur, Honeoye Falls, NY (US); Abdullah B. Alp, West Henrietta, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 610 days.

(21) Appl. No.: 11/449,931

(22) Filed: Jun. 9, 2006

(65) Prior Publication Data

US 2007/0287044 A1    Dec. 13, 2007

(51) Int. Cl.
*H01M 8/04* (2006.01)
(52) U.S. Cl. .......................................... 429/13; 429/25
(58) Field of Classification Search .................... 429/13, 429/17, 22, 25, 34
See application file for complete search history.

(56) References Cited

U.S. PATENT DOCUMENTS

| | | | | |
|---|---|---|---|---|
| 6,887,609 | B2 * | 5/2005 | Kaufmann | 429/34 |
| 7,037,609 | B2 * | 5/2006 | Sugawara et al. | 429/17 |
| 7,374,833 | B2 * | 5/2008 | Stute | 429/34 X |
| 2006/0216560 | A1 * | 9/2006 | Voller et al. | 429/34 X |

\* cited by examiner

*Primary Examiner*—Stephen J. Kalafut
(74) *Attorney, Agent, or Firm*—John A. Miller; Miller IP Group, PLC

(57) ABSTRACT

A system and method for limiting the amount of hydrogen being bled from an anode exhaust line. The method includes maintaining a pressure bias between an anode outlet and a cathode outlet of a fuel cell stack so that when an anode exhaust gas is bled from the anode exhaust line and mixed with the cathode exhaust gas, the concentration of hydrogen in the mixed gas is maintained below a predetermined percentage. The pressure bias is such that the anode exhaust gas has a higher gas pressure than the cathode exhaust gas.

21 Claims, 1 Drawing Sheet

EXHAUST EMISSIONS CONTROL OF HYDROGEN THROUGHOUT FUEL CELL STACK OPERATION

BACKGROUND OF THE INVENTION

1. Field of the Invention

This invention relates generally to a system and method for controlling the concentration of hydrogen being bled from an anode exhaust gas flow and, more particularly, to a system and method for controlling the concentration of hydrogen being bled from an anode exhaust gas flow by controlling the differential pressure between the cathode side and the anode side of a fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through so many fuel cells in parallel.

It has been proposed in the art to provide stack order switching or flow shifting in a fuel cell system that employs split stacks. Particularly, suitable valves and plumbing in the system are provided so that the anode exhaust gas exiting a first sub-stack is sent to the anode input of a second sub-stack, and the anode exhaust gas exiting the second sub-stack is sent to the anode input of the first sub-stack in a cyclical manner.

It is desirable that the distribution of hydrogen within the anode flow channels in the fuel cell stack be substantially constant for proper fuel cell stack operation. Therefore, it is known in the art to input more hydrogen into the fuel cell stack than is necessary for a certain output load of the stack so that the anode gas evenly distributed. However, because of this requirement, the amount of hydrogen in the anode exhaust gas is significant, and would lead to low system efficiency if that hydrogen were discarded. Therefore, it is known in the art to recirculate the anode exhaust gas back to the anode input to reuse the discarded hydrogen.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode gas output of the fuel cell stack to remove nitrogen from the anode side of the stack.

The recirculation gas that is periodically bled from the anode recirculation loop typically includes a considerable amount of hydrogen. It is known in the art to direct the bled recirculation gas to a combustor to burn most or all of the hydrogen therein before the recirculation gas is exhausted to the environment. However, the combustor adds a significant cost, weight and complexity to the fuel cell system, which is undesirable.

It is also known in the art to eliminate the combustor and directly mix the recirculation gas with the cathode exhaust gas. If the recirculation gas is directly mixed with the cathode exhaust gas without control, the amount of hydrogen in the recirculation gas is unknown. A hydrogen concentration sensor can be provided in the cathode exhaust gas line after the mixing point with the recirculation gas to detect the concentration of hydrogen. The hydrogen concentration sensor would provide a signal to the controller during the bleed indicative of the concentration of hydrogen in the mixed exhaust gas. If the concentration of hydrogen was to high, the controller would increase the speed of the compressor to provide more cathode exhaust air to lower the concentration of hydrogen. If the compressor was unable to effectively keep the concentration of hydrogen below the safe limit for the stack load, then the controller would have to close the bleed valve. However, the hydrogen sensor would have to be inexpensive and be able to within stand the humidity of the exhaust gas. Currently, known hydrogen concentration sensors are unable to provide these requirements.

SUMMARY OF THE INVENTION

In accordance with the teachings of the present invention, a system and method for limiting the amount of hydrogen being bled from an anode exhaust gas flow in a fuel cell system is disclosed. The method includes maintaining a pressure bias between an anode outlet and a cathode outlet of the fuel cell stack so that when an anode exhaust gas is bled and mixed with the cathode exhaust gas, the concentration of hydrogen in the mixed gas is maintained below a predetermined percentage. The pressure bias is such that the anode exhaust gas has a higher gas pressure than the cathode exhaust gas. During system start-up, cathode inlet air by-passes the stack to be mixed directly with the mixed cathode exhaust and anode exhaust. The method sets a slew rate limit on the pressure bias during up power transients on the stack so that any delay between providing cathode air to the stack and hydrogen reactant gas to the stack is reduced. The method also sometimes prevents a hydrogen exhaust gas bleed during a down power transient.

Additional features of the present invention will become apparent from the following description and appended claims, taken in conjunction with the accompanying drawings.

DETAILED DESCRIPTION OF THE EMBODIMENTS

Figure 1:
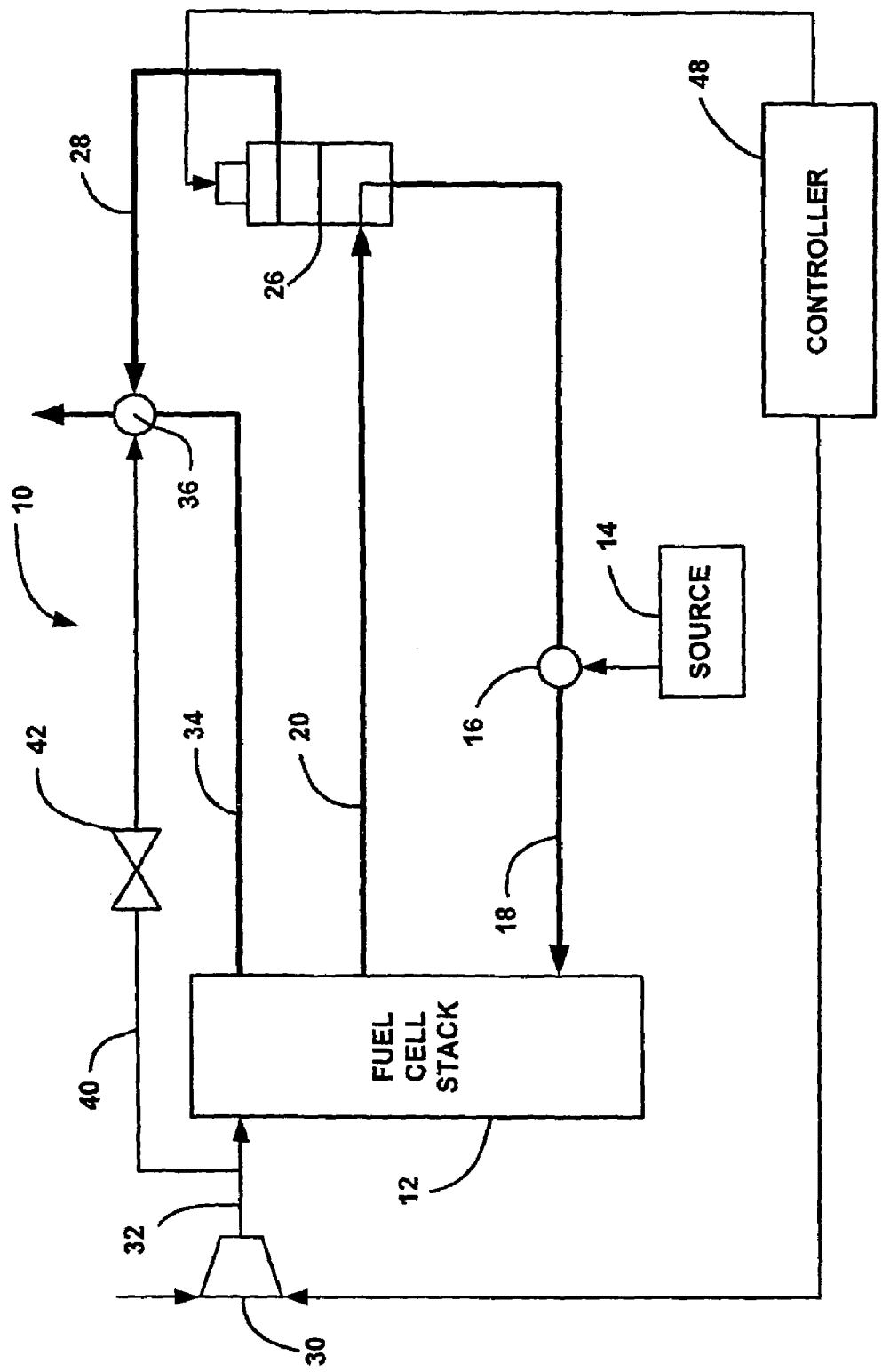
FIG. 1 is a block diagram of a fuel cell system that controls a nitrogen bleed, according to an embodiment of the present invention.

The following discussion of the embodiments of the invention directed to a method for controlling the amount of hydrogen being bled from an exhaust gas flow in a fuel cell system is merely exemplary in nature, and is in no way intended to limit the invention or its applications or uses. For example, the discussion below describes a method for controlling the amount of hydrogen being bled from an exhaust gas flow from an anode recirculation loop. However, the method for controlling the amount of hydrogen being bled from an exhaust gas flow of the invention has application for other fuel cell systems, such as those employing split stacks and anode flow shifting.

FIG. 1 is a schematic block diagram of a fuel cell system 10 including a fuel cell stack 12. Hydrogen gas from a hydrogen source 14 is provided to a mixing junction 16 and then sent to the anode side of the fuel cell stack 12 on line 18. An anode exhaust gas is output from the fuel cell stack 12 on line 20 and is sent to a bleed valve 26. A recirculation pump (not shown) pumps the anode exhaust gas through the valve 26 to the mixing junction 16 to be mixed with fresh hydrogen from the source 14 to provide an anode recirculation loop. The proper mixture of the fresh hydrogen from the source 14 and the recirculated anode exhaust gas at the mixing junction 16 sets the pressure of the anode side of the stack 12.

The fuel cell system 10 also includes a compressor 30 that provides cathode air on line 32 to the cathode side of the fuel cell stack 12. The cathode exhaust gas from the stack 12 is output from the stack 12 on cathode exhaust gas line 34.

As discussed above, nitrogen cross-over from the cathode side of the fuel cell stack 12 dilutes the hydrogen in the anode side that affects stack performance. Therefore, it is necessary to periodically bleed the anode exhaust gas to reduce the amount of nitrogen being recirculated. During the nitrogen bleed, the valve 26 is controlled to switch the anode exhaust gas from the recirculation loop to an exhaust line 28. In this embodiment, the bled recirculation gas in the line 28 is mixed with the cathode exhaust gas on line 34 in a mixing junction 36.

The system 10 also includes a line 40 coupled to the cathode input line 32 and the mixing junction 36. As will be discussed in more detail below, during certain times of the operation of the fuel cell system 10 it may be desirable to by-pass the fuel cell stack 12 with some of the cathode input air by controlling a by-pass valve 42 so that there is more air in the cathode exhaust gas to reduce the concentration of hydrogen.

The present invention proposes a method for controlling the hydrogen emissions in the exhaust of the fuel cell system 10. In certain fuel cell systems designs, it is desirable to maintain the percentage of hydrogen in the mixed anode and cathode exhaust gas to be less than 2% by volume, between 2% and 4% by volume for only a few seconds, and never more than 4% by volume.

A fuel cell system basically has four modes of operation. Particularly, the fuel cell system has a start-up mode, a steady state operation mode, power transient operation modes and a shut-down mode. According to the invention, the concentration of hydrogen in the mixed cathode/anode exhaust gas during an anode bleed is limited by limiting the amount of hydrogen being emitted from the recirculation loop. The present invention proposes limiting the amount of hydrogen in the mixed cathode and anode exhaust by providing a pressure differential between the cathode side of the stack 12 and the anode side of the stack 12 where the anode side has a higher pressure than the cathode side within a preset range.

According to the invention, the pressure differential between the anode side and the cathode side of the stack 12 has an upper boundary and a lower boundary depending on various factors. For example, the anode side pressure should be at least 10 kPa higher than the cathode side pressure to prevent the cathode exhaust gas from flowing into the anode side of the stack as a result of sensor inaccuracies, flow shifting effects, etc. However, the pressure bias should be as high as possible at all times so that the maximum anode exhaust gas flow rate allowed occurs during a bleed. A higher flow rate is important to remove as much water and nitrogen as possible from the anode flow channels during the bleed. The value of 10 kPa at low stack current densities will cause a low enough concentration of hydrogen in the mixed exhaust gas even though the amount of air in the exhaust gas is low. At high current densities, the pressure bias can be about 35 kPa to provide sufficient flow to remove water without an increase in the concentration of hydrogen in the mixed exhaust gas because of the greater amount of air.

At system start-up, air is in the anode flow channels from the previous shut-down and hydrogen is injected into the anode flow channels. The hydrogen/air front should move through the anode side of the stack 12 as quickly as possible, as is well understood in the art, for various reasons, such as a quicker, more reliable start. To provide this quick start, a significant amount of hydrogen must flow through the anode side of the stack 12 to displace the air creating a potential problem with excessive hydrogen being exhausted.

According to the invention, a specialized control algorithm within the controller 48 is used to reduce the hydrogen emissions during start-up. Particularly, the compressor 30 is started before the hydrogen flow and the valve 42 is opened so that air in the line 40 is sent to the mixing junction 36. Soon thereafter, the hydrogen injectors (not shown) begin injecting hydrogen into the anode side of the stack 12 and out of the bleed valve 26. The cathode air that by-passes the stack 12 dilutes this initial slug of hydrogen that displaces the air present within the anode flow channels so that the hydrogen emissions is maintained below 2% by volume. After some predetermined period of time, the valve 42 is closed, and all of the air from the compressor 30 is directed through the cathode side of the stack 12 consistent with the load on the stack 12. Further, the bleed valve 26 is closed. During this time, there are no more hydrogen emissions and the fuel cell reaction causes the cell voltages to reach an open circuit voltage. At some time after this point, the system 10 transitions into a normal run mode and power is allowed to be drawn from the stack 12.

During the steady state operation, a "pressure bias" is maintained between the recirculation gas from the bleed valve 26 during the bleed and the cathode exhaust gas on the line 34, where the recirculation gas pressure at the bleed valve 26 is higher than the cathode exhaust gas pressure on the line 34. This pressure differential between the cathode side and the anode side of the fuel cell system 10 maintains the concentration of hydrogen in the mixed cathode and anode exhaust gas to be below 2%.

The system 10 is calibrated so that for a given cathode reactant gas flow/cathode stoichiometry, as a function of current density, a desriable pressure bias between the cathode side and the anode side will be provided. In other words, if the steady state cathode stoichiometry at 0.2 A/cm$^2$ is 3.0, there will be a corresponding calibrated pressure bias of, for example, 25 kPa higher at the anode side of the stack 12 that will result in a slightly less than 2% mixed air/hydrogen exhaust concentration, even if the anode hydrogen concentration is 100%. Thus, even if the bleed valve 26 is constantly opened, the steady state exhaust concentration will never exceed 2%. A pressure bias table can be provided for steady state operation where a desired pressure differential between the cathode and anode sides of the stack 12 is maintained regardless of the load on the stack 12. Typically, the pressure bias values will be the smallest near idle, for example 10 kPa, and the highest at high power, for example 35 kPa, for differing levels of hydrogen.

The pressure bias table discussed above may not prevent excessive hydrogen exhaust emissions during an up power transient because a higher pressure bias can increase the hydrogen exhaust concentration for a very short time because the hydrogen injectors respond faster than the compressor 30. In order to address this potential problem, the present invention proposes a slew rate limit on the pressure bias set-point on up power transients. For example, from an idle power to a maximum power request from the stack 12, the set-point would normally step from 10 kPa to 35 kPa. The higher hydrogen flow caused by this higher pressure bias is sometimes not diluted sufficiently until the compressor 30 gets to the desired cathode set-point for maximum power. If the rise rate of the pressure bias set-point is limited to less than the cathode flow rise rate, then the hydrogen remains sufficiently diluted through the up power transient.

If there is a quick down power transient of significant magnitude and speed, the pressure bias may not have enough time to rise significantly, and thus, the system may provide excessive hydrogen in the anode exhaust gas on the down power transient during a recirculation bleed. According to the invention, the algorithm can prevent or over-ride a bleed request during a power down transient to prevent too much hydrogen in the mixed exhaust gas.

The down power transient is particularly troublesome if it occurs after a high power transient or after the stack 12 has been running at high power for a long period of time. If the system 10 is at maximum or high power, there is a lot of hydrogen flow through the anode channels, most of which is consumed by the reaction. As soon as a down power transient occurs, there is all of a sudden a lot of hydrogen present and no place to consume it in the stack 12. Fortunately, there is also no need to bleed any anode exhaust through the bleed valve 26 into the cathode exhaust for some short period of time during these down power transients. Therefore, the present invention over-rides any bleed request when a down power transient is detected, and maintains the bleed valve 26 closed for a short period of time. After this period of time has passed, the over-ride will end and normal bleed operation can resume. This will prevent excessive hydrogen concentration in the cathode exhaust mixture during a large down power transient.

At system shut-down, it is desirable that the system 10 purge the cathode and anode flow channels in the stack 12 to remove as much water as possible to prevent freezing after shut-down and to prevent cell flooding on a subsequent restart at colder temperatures. During this shut-down purge, there is more than enough cathode air being exhausted on line 34 to dilute the majority of the hydrogen present in the system 10 at shut-down.

Further, in some fuel cell system designs, the compressor 30 is a turbo compressor to provide a large volume of airflow for high power demands. During those times when the power request is low, the compressor 30 would have a difficult time maintaining a steady low flow rate. Therefore, some of the cathode flow may be diverted around the stack 12 through the valve 42 so that the compressor 30 can run faster than what is necessary for the system power demand.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack;
    a cathode input line providing cathode input air to the fuel cell stack;
    an anode input line providing an anode input gas to the fuel cell stack;
    a cathode output line providing a cathode exhaust gas from the fuel cell stack;
    an anode exhaust line providing an anode exhaust gas from the fuel cell stack;
    a mixing junction for mixing the cathode exhaust gas and the anode exhaust gas; and
    a controller for limiting the concentration of hydrogen in the mixed cathode and anode exhaust gas, said controller maintaining a pressure bias between the anode output line and the cathode output line where the pressure bias maintains the pressure higher in the anode output line than the pressure in the cathode output line so as to maintain the concentration of hydrogen below a predetermined percentage.

2. The system according to claim 1 wherein the controller is calibrated so that for a certain cathode airflow and cathode stoichiometry for a desired stack current density, a corresponding anode exhaust gas flow is provided so that the anode exhaust gas pressure is higher than the cathode exhaust gas pressure by a predetermined value so that the cathode exhaust gas flow maintains the concentration of hydrogen in the mixed exhaust gas below the predetermined percentage.

3. The system according to claim 2 wherein the anode exhaust gas pressure is higher than the cathode exhaust gas pressure depending on the current density of the stack within the range of 10 kPa-35 kPa.

4. The system according to claim 1 further comprising an anode exhaust gas bleed valve, said bleed valve being controlled by the controller so that some times the anode exhaust gas is mixed with the cathode exhaust and sometimes the anode exhaust gas is recirculated back to the anode input line.

5. The system according to claim 4 wherein the controller prevents a hydrogen exhaust gas bleed through the bleed valve during a down power transient.

6. The system according to claim 1 further comprising a compressor and a by-pass valve, said compressor providing the cathode inlet air to the fuel cell stack and said controller controlling the by-pass valve to provide compressor air that by-passes the fuel cell stack that is mixed with the cathode exhaust gas and the anode exhaust gas.

7. The system according to claim 6 wherein the controller opens the by-pass valve at system start-up.

8. The system according to claim 7 wherein the controller provides cathode air through the stack and by-passing the stack at system start-up at one point of time, and then allows hydrogen to flow into the stack at a later time so that a significant amount of air is provided at the mixing junction for the hydrogen that may flow through the stack at start-up.

9. The system according to claim 1 wherein the controller sets a slew rate limit on the pressure bias during up power transients on the fuel cell stack so that any delay between a compressor providing cathode air and a hydrogen source providing hydrogen reactant gas is reduced.

10. The system according to claim 1 wherein the pressure bias maintains the hydrogen concentration below 2% by volume.

11. A fuel cell system comprising:
a fuel cell stack;
a compressor providing cathode input air to the cathode side of the stack;
a by-pass valve for allowing cathode input air to by-pass the fuel cell stack;
an anode exhaust bleed valve for bleeding anode exhaust gas from the stack;
a mixing junction for mixing cathode exhaust gas from the stack and the anode exhaust gas bled from the stack through the bleed valve; and
a controller for limiting the concentration of hydrogen in the mixed cathode and anode exhaust gas, said controller maintaining a pressure bias between an anode exhaust gas outlet and a cathode exhaust gas outlet so as to maintain the concentration of hydrogen below a predetermined percentage where the pressure bias provides a higher anode exhaust gas pressure than the cathode exhaust gas pressure, said controller controlling the by-pass valve at system start-up to provide cathode air that by-passes the stack and is mixed with the cathode exhaust gas and the anode exhaust gas, said controller setting a slew rate limit on the pressure bias during up power transients on the stack so that any delay between the compressor providing the cathode input air and a hydrogen source providing a hydrogen reactant gas is reduced, said controller further preventing a hydrogen exhaust bleed through the bleed valve during a down power transient.

12. The system according to claim 11 wherein the controller is calibrated so that for a certain cathode airflow and cathode stoichiometry for a desired stack current density, a corresponding anode exhaust gas flow is provided so that the anode exhaust gas pressure is higher than the cathode exhaust gas pressure by a predetermined value so that the cathode exhaust gas flow maintains the concentration of hydrogen in the mixed exhaust gas below the predetermined percentage.

13. The system according to claim 12 wherein the anode exhaust gas pressure is higher than the cathode exhaust gas pressure depending on the current density of the stack within the range of 10 kPa-35 kPa.

14. The system according to claim 11 wherein the controller provides cathode air through the stack and by-passing the stack at system start-up at one point of time, and then allows hydrogen to flow into the stack at a later time so that a significant amount of air is provided at the mixing junction for the hydrogen that may flow through the stack at start-up.

15. The system according to claim 11 wherein the pressure bias maintains the hydrogen concentration below 2% by volume.

16. A method for limiting the concentration of hydrogen in a mixed cathode and anode exhaust gas from a fuel cell stack, said method comprising:
providing an anode exhaust gas from the stack;
providing a cathode exhaust gas from the stack;
mixing the anode exhaust gas and the cathode exhaust gas from the stack; and
maintaining a pressure bias between an anode outlet and a cathode outlet to maintain the concentration of hydrogen below a predetermined percentage where the anode exhaust gas pressure is higher than the cathode exhaust gas pressure.

17. The method according to claim 16 further comprising providing a certain cathode airflow to the stack and a cathode stoichiometry for a desired stack current density, wherein providing an anode exhaust gas from the stack includes providing a corresponding anode exhaust gas flow so that the anode exhaust gas pressure is higher than the cathode exhaust gas pressure by a predetermined value so that the cathode exhaust gas flow maintains the concentration of hydrogen in the mixed exhaust gas below the predetermined percentage.

18. The method according to claim 17 wherein the anode exhaust gas pressure is higher than the cathode exhaust gas pressure depending on the current density of the stack within the range of 10 kPa-35 kPa.

19. The method according to claim 16 further comprising mixing cathode input air with the mixed cathode and anode exhaust gas at system start-up.

20. The method according to claim 16 further comprising setting a slew rate limit on the pressure bias during up power transients on the stack so that any delay between cathode input air to the stack and hydrogen reactant gas to the stack is reduced.

21. The method according to claim 16 further comprising preventing an anode exhaust gas bleed through the bleed valve during a down power transient.

* * * * *